(12) United States Patent
Thatcher

(10) Patent No.: US 10,531,616 B2
(45) Date of Patent: Jan. 14, 2020

(54) SYSTEM AND METHOD FOR SOLID STATE TOWER CONTROL

(71) Applicant: Valmont Industries, Inc., Omaha, NE (US)

(72) Inventor: Tracy A. Thatcher, Gretna, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 16/038,859

(22) Filed: Jul. 18, 2018

(65) Prior Publication Data

US 2019/0021245 A1 Jan. 24, 2019

Related U.S. Application Data

(60) Provisional application No. 62/534,822, filed on Jul. 20, 2017.

(51) Int. Cl.
*A01G 25/09* (2006.01)
*A01G 25/16* (2006.01)
(Continued)

(52) U.S. Cl.
CPC .......... *A01G 25/092* (2013.01); *A01G 25/09* (2013.01); *A01G 25/162* (2013.01);
(Continued)

(58) Field of Classification Search
CPC ...... A01G 25/09; A01G 25/092; A01G 25/16; G05B 13/0265; G05B 13/041;
(Continued)

(56) References Cited

U.S. PATENT DOCUMENTS 3,823,730 A 7/1974 Sandstrom et al.
4,138,705 A 2/1979 Doll
(Continued)

FOREIGN PATENT DOCUMENTS

CN 103891581 1 A † 7/2014
WO 9728692 A1 8/1997

OTHER PUBLICATIONS

International Application PCT/US2015/055634 International Search Report dated Jan. 31, 2019, 4 pages.

*Primary Examiner* — Crystal J Barnes-Bullock
(74) *Attorney, Agent, or Firm* — Milligan PC LLO

(57) ABSTRACT

The present invention provides a system for providing power, control and communications within an irrigation system having at least one span and a drive system for moving the span. According to a preferred embodiment, the present invention preferably includes a pivot panel which includes a pivot panel processor for receiving, controlling and initiating the transmission of power and control signals to a plurality of solid state tower boxes. According to a further preferred embodiment, a system in accordance with the present invention preferably further includes a power-line BUS electrically connected to the pivot panel processor and to a power-line carrier. According to a further preferred embodiment, the power-line carrier of the present invention preferably provides power and electrical control signals to a number of solid state tower boxes. According to a further preferred embodiment, the solid-state tower boxes preferably control power to motor elements within each tower box.

16 Claims, 7 Drawing Sheets

(51) Int. Cl.
*G05B 19/042* (2006.01)
*G05D 1/02* (2006.01)
*G05B 15/02* (2006.01)

(52) U.S. Cl.
CPC ......... *A01G 25/165* (2013.01); *A01G 25/167* (2013.01); *G05B 15/02* (2013.01); *G05B 19/0426* (2013.01); *G05D 1/0268* (2013.01); *G05D 1/0278* (2013.01); *G05B 2219/2625* (2013.01); *G05D 2201/0201* (2013.01)

(58) Field of Classification Search
CPC .... G05B 15/02; G05D 1/0268; G05D 1/0278; G05D 2201/0201
See application file for complete search history.

(56) References Cited

U.S. PATENT DOCUMENTS

| | | | |
|---|---|---|---|
| 4,508,269 A * | 4/1985 | Davis | A01G 25/092 239/729 |
| 4,549,694 A * | 10/1985 | Davis | A01G 25/092 239/729 |
| 4,569,481 A * | 2/1986 | Davis | A01G 25/092 239/729 |
| 4,580,731 A | 4/1986 | Kegel et al. | |
| 4,626,984 A † | 12/1986 | Unruh | |
| 4,693,425 A * | 9/1987 | Meis | A01G 25/092 239/735 |
| 4,763,836 A | 8/1988 | Lyle et al. | |
| 5,246,164 A * | 9/1993 | McCann | A01B 79/005 239/11 |
| 5,884,224 A * | 3/1999 | McNabb | A01G 7/00 700/284 |
| 5,927,603 A * | 7/1999 | McNabb | A01G 25/092 239/63 |
| 6,755,362 B2 | 6/2004 | Krieger et al. | |
| 7,584,053 B2 † | 9/2009 | Abts | |
| 8,739,830 B2 | 6/2014 | Bradbury et al. | |
| 8,763,937 B2 | 7/2014 | Pfrenger et al. | |
| 8,777,133 B2 | 7/2014 | Korus et al. | |
| 8,829,736 B2 | 9/2014 | Pickerill et al. | |
| 8,876,026 B2 | 11/2014 | Pfrenger | |
| 8,936,208 B2 | 1/2015 | Pfrenger | |
| 9,022,305 B2 † | 5/2015 | Malsam | |
| 9,055,720 B2 | 6/2015 | Korus | |
| 9,459,628 B1 | 10/2016 | Abts | |
| 9,622,398 B2 | 4/2017 | Gaus | |
| 9,661,808 B2 | 5/2017 | Abts et al. | |
| 10,209,720 B2 * | 2/2019 | Pfrenger | A01G 25/092 |
| 2006/0027677 A1 | 2/2006 | Abts | |
| 2007/0001035 A1 | 1/2007 | Barker | |
| 2007/0272510 A1 | 11/2007 | Kawakami | |
| 2009/0166451 A1 | 7/2009 | Parod et al. | |
| 2013/0008977 A1 | 1/2013 | Pfrenger et al. | |
| 2013/0253752 A1 | 9/2013 | Grabow | |
| 2014/0225747 A1 * | 8/2014 | Abts | H04Q 9/00 340/870.11 |
| 2014/0326808 A1 | 11/2014 | Malsam | |
| 2014/0371971 A1 | 12/2014 | Welch | |
| 2015/0053786 A1 | 2/2015 | Rosa | |
| 2015/0060580 A1 | 3/2015 | Welch | |
| 2015/0081120 A1 | 3/2015 | Pfrenger | |
| 2015/0316111 A1 | 11/2015 | Tanabe et al. | |
| 2015/0351309 A1 | 12/2015 | Gaus | |
| 2015/0351335 A1 | 12/2015 | Abts et al. | |
| 2017/0055467 A1 | 3/2017 | Andrews et al. | |
| 2018/0310496 A1 † | 11/2018 | Andrews | |
| 2018/0348714 A1 * | 12/2018 | Larue | G05B 13/041 |
| 2019/0104696 A1 * | 4/2019 | Fischman | A01G 25/167 |

\* cited by examiner
† cited by third party

SYSTEM AND METHOD FOR SOLID STATE TOWER CONTROL

RELATED APPLICATION

The present application claims priority to U.S. Provisional Application No. 62/534,822 filed Jul. 20, 2017.

BACKGROUND AND FIELD OF THE PRESENT INVENTION

Field of the Present Invention

The present invention relates generally to a system and method for irrigation management and, more particularly, to a system and method for providing solid state tower control for a mechanical irrigation machine.

Background of the Invention

Modern center pivot and linear irrigation systems generally include interconnected spans (e.g., irrigation spans) supported by one or more tower structures to support the conduits (e.g., water pipe sections). In turn, the conduits are further attached to sprinkler/nozzle systems which spray water (or other applicants) in a desired pattern. In these modern irrigation systems, a significant number of powered elements are used to control various aspects of irrigation. These often include remote, independent power for a variety of sensors, sprayers, drive control systems, motors and transducers.

In operation, control and powering of each of these powered elements is accomplished via systems of electro-mechanical devices including relays, switches and other devices with moving parts. Given their size and complexity, modern irrigation machines are prone to repeated mechanical and electrical breakdowns. The frequency of these breakdowns is further impacted by the rough environments in which the irrigation machines must function. These environments include extreme heat, high particulate levels, and periods of heavy moisture. The mechanical and electrical breakdowns are further impacted by the repeated need to run irrigation machines continually for long periods of time. Additionally, the irrigation machines are subjected to repeated mechanical shocks from bumps and impacts incurred while moving across rutted fields.

The complexity of modern irrigation machines in combination with their rough usage places significant burdens on growers and operators to keep these machines in operation. Often, mechanics and technicians must be kept nearby or on call to ensure that the irrigation machines stay functional during critical farming operations. However, even with vigilance and support, frequent periods of downtime are commonly experienced. The economic impact of this downtime is significant. Modern farming operations are carefully timed and synchronized with changing weather patterns and the growing stages of each crop. Accordingly, any downtime can represent an important period of missed opportunity which can often result in higher costs and lower yields for an operator.

To overcome the limitations of the prior art, a reliable and effective system is needed to control and power the operations of an irrigation machine in a variety of different conditions.

SUMMARY OF THE PRESENT INVENTION

To address the shortcomings presented in the prior art, the present invention provides a system for providing power, control (including alignment) and communications within an irrigation system having at least one span and a drive system for moving the span. According to a first preferred embodiment, a system in according with the present invention preferably includes a plurality of sprinkler heads which are supplied water (or other applicants) under pressure to spray onto a field to be irrigated. According to a further preferred embodiment, a system in accordance with the present invention preferably may further include transducers, GPS receiver(s) and control systems for controlling the flow of water through the system. According to a further preferred embodiment, the present invention preferably further includes a pivot panel which includes a pivot panel processor for receiving, controlling and initiating the transmission of power, and control and communication signals to a plurality of solid state tower boxes. According to a further preferred embodiment, a system in accordance with the present invention preferably further includes a power-line BUS electrically connected to the pivot panel processor and to a network of power-line carriers. According to a further preferred embodiment, the power-line carrier of the present invention preferably provides power and electrical control signals to a number of solid state motor controllers.

According to a further preferred embodiment, a system in accordance with the present invention preferably further includes a first drive tower which includes a first tower box, a first tower drive unit, and a plurality of first tower drive wheels. According to a further preferred embodiment, the first tower box is electrically connected to the drive motor of the first tower drive unit and the first tower box is programmed to receive control signals and direct power to the first tower drive unit which responsively provides power to produce torque and braking on the first drive wheels.

According to a further preferred embodiment, a system in accordance with the present invention preferably further includes a second drive tower which includes a second tower box, a second tower drive unit, and a plurality of second tower drive wheels. According to a further preferred embodiment, the second tower box is electrically connected to the motor of the second tower drive unit and the second tower box is programmed to receive control signals and direct power to the second tower box drive unit which responsively provides power to produce torque and braking on the second drive wheels.

According to a further preferred embodiment, a system in accordance with the present invention preferably further includes a third drive tower which includes a third tower box, a third tower drive unit, and a plurality of third tower drive wheels. According to a further preferred embodiment, the third tower box is electrically connected to the motor of the third tower drive unit and the third tower box is programmed to receive control signals and direct power to the third tower box drive unit which responsively provides power to produce torque and braking on the third drive wheels.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
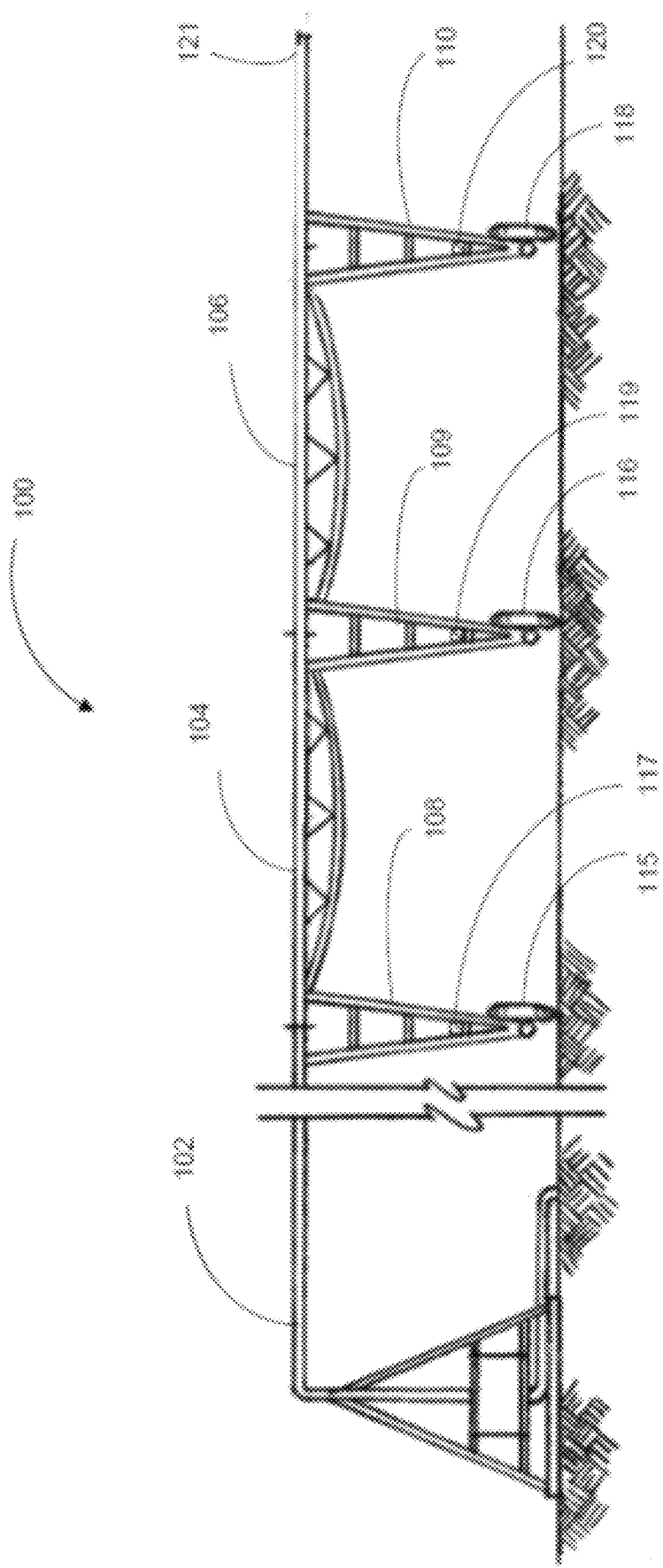
FIG. 1 shows an exemplary irrigation system for use with the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including: a motor, a controller, a communication device (such as a PLC or the like) and an alignment, position and/or orientation sensor/device. Further, it should be understood that while the invention is discussed below with respect to three exemplary towers, the number of towers used may be expanded or reduced (i.e. 1-100 towers) as needed without departing from the spirit of the present invention.

The terms "program," "computer program," "software application," "module," firmware" and the like as used herein, are defined as a sequence of instructions designed for execution on a computer system. The term "solid state" should be understood to refer to a range of solid state electronic devices which preferably include circuits or devices built from solid materials and in which the electrons, or other charge carriers, are confined entirely within the solid material. Exemplary solid-state components/materials may include crystalline, polycrystalline and amorphous solids, electrical conductors and semiconductors. Common solid-state devices may include transistors, microprocessor chips, and RAM.

A program, computer program, module or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes: microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neutral network) logic, quantum devices, and hybrids of any of the above device types. Of course, the underlying device technologies may be provided in a variety of component types, e.g., metal-oxide semiconductor field-effect transistor (MOS-FET) technologies like complementary metal-oxide semiconductor (CMOS), bipolar technologies like emitter-coupled logic (ECL), polymer technologies (e.g., silicon-conjugated polymer and metal-conjugated polymer-metal structure), bidirectional triode thyristors (TRIAC), mixed analog and digital, and the like.

FIGS. 1-6 illustrate various configurations of irrigation systems which may be used with example implementations of the present invention. As should be understood, the irrigation systems shown in FIGS. 1-6 are exemplary systems onto which the features of the present invention may be integrated. Accordingly, FIGS. 1-6 are intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase or poly phase AC, synchronous or asynchronous AC and the like.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. As further shown in FIG. 1, the irrigation machine 100 may preferably further include an extension/overhang 121 which may include an endgun (not shown).

Figure 2:
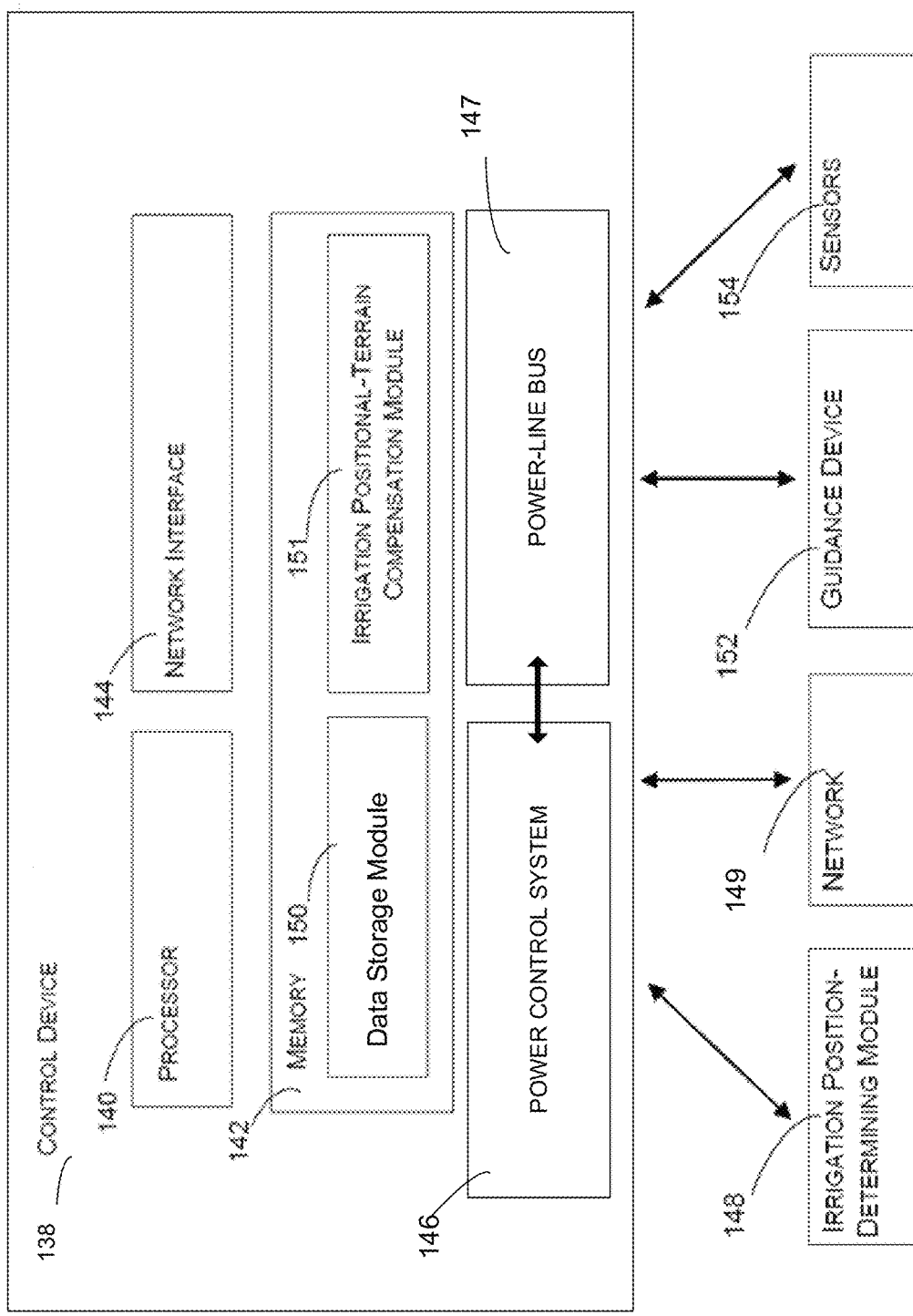
FIG. 2 shows a block diagram illustrating the exemplary processing architecture of a control device in according with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, a positioning module 151, a data storage module 150 and a network interface 144. The processor 140 provides processing functionality for the control device 138 and may include any number of processors, micro-controllers, or other processing systems. The processor 140 may execute one or more software programs that implement techniques described herein. The memory 142 is an example of tangible computer-readable media that provides storage functionality to store various data associated with the operation of the processor 140 such as the software program and code segments mentioned above, or other data to instruct the processor 140 and other elements of the control device 138 to perform the steps described herein. The memory 142 may include, for example, removable and non-removable memory elements such as RAM, ROM, Flash (e.g., SD Card, mini-SD card, micro-SD Card), magnetic, optical, USB memory devices, and so forth. The network interface 144 provides functionality to enable the control device 138 to communicate with one or more networks 149 through a variety of components such as wireless access points, transceivers and so forth, and any associated software employed by these components (e.g., drivers, configuration software, and so on).

In implementations, exemplary control device 138 preferably further includes a power control system 146 and a power-line BUS which may include conductive transmission lines, circuits and the like for controlling and routing electric power, controlling its quality, and controlling the devices attached to a power-line carrier system as discussed further below. Further, the system of the present invention preferably may further include an irrigation position-determining module 148 which may include a global positioning system (GPS) receiver (with or without real-time kinematic corrections/RTK) or the like to calculate a location of the irrigation system 100. Further, the control device 138 may be coupled to a guidance device or similar system 152 of the irrigation system 100 (e.g., steering assembly or steering mechanism) to control movement of the irrigation system 100. As shown, the control device 138 may further include a positional-terrain compensation module 151 to assist in controlling the movement and locational awareness of the system. Further, the control device 138 may preferably further include multiple inputs and outputs to receive data from sensors 154 and monitoring devices as discussed further below.

Figure 3:
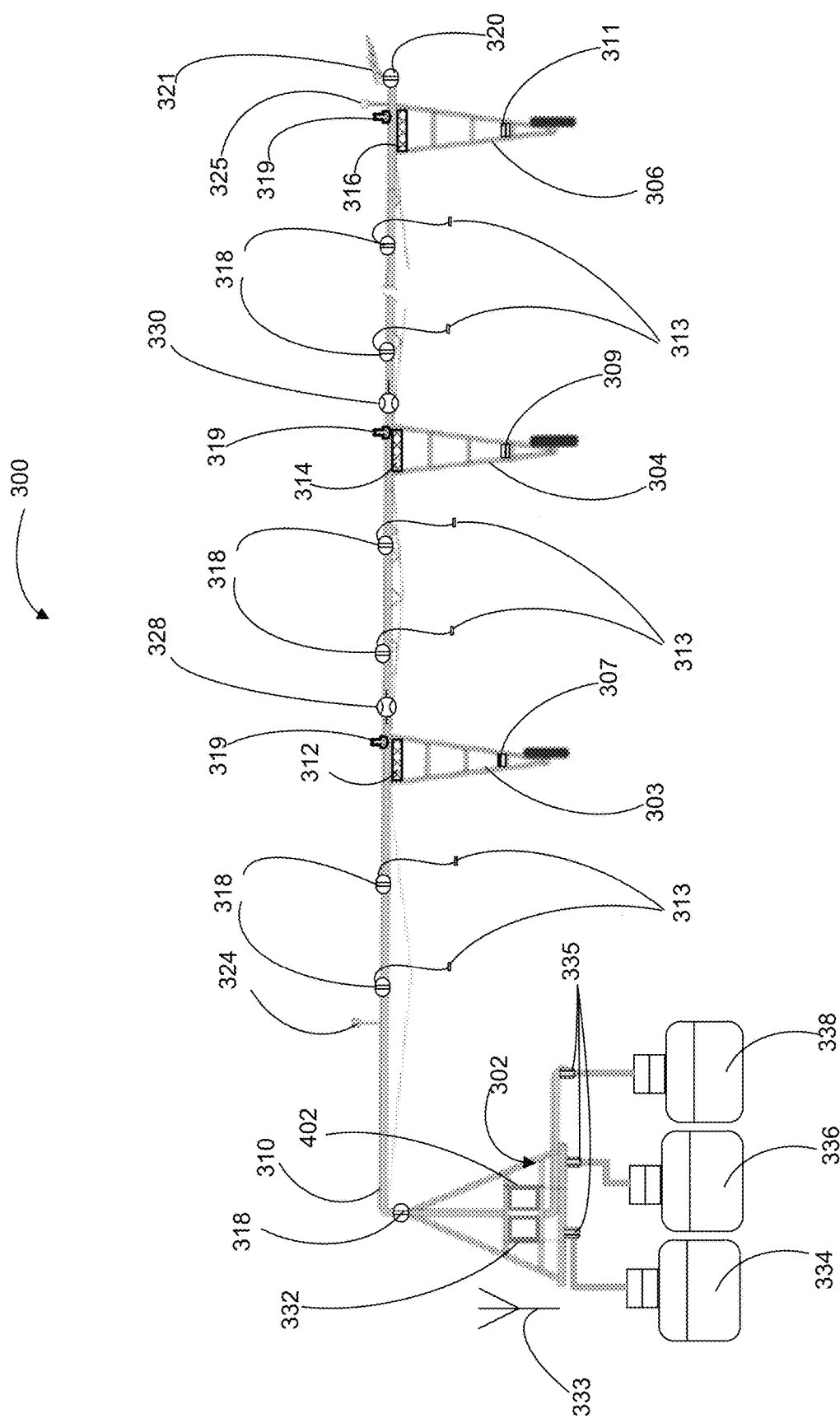
FIG. 3 shows a block diagram in accordance with further preferred embodiment of the present invention.

With reference now to FIG. 3, an exemplary system 300 incorporating aspects of the present invention shall now be further discussed. As shown, the system 300 may preferably be attached to a water source 302 or the like to supply water or applicants under pressure to the system 300. Additionally, the system may preferably be able to receive water or applicants under pressure from tanks or reservoirs 334, 336, 338 (which may contain water, chemicals and biologics respectively) via injection pumps 335 or the like. As further shown, an exemplary irrigation system 300 may include valve assemblies 318, 320 which control water flow to a variety of emitters 313 and an end gun 321. Further the system as shown may preferably include exemplary transducers 328, 330 for monitoring water pressure. Further, the system includes respective drive towers 303, 304, 306 to support and move the entire span 310. Further, the system 300 of the present invention may preferably further include a control/pivot panel 402 as well as a flow meter 332 for monitoring overall water flow in the system.

Further the system may preferably include solid state tower boxes 312, 314, 316 (including the solid-state motor controllers, non-contact alignment devices and other components as discussed further below) which are preferably interconnected to respective drive units 307, 309, 311. As further shown, the respective drive units 307, 309, 311 preferably provide torque and braking to respective sets of drive wheels.

Further, the system 300 may preferably further include GPS receivers 319 for receiving positional data. Still further, a system may include indirect crop sensors which preferably may include optional moisture sensors to determine the moisture levels in a given area of soil. Additionally, the sensors may further include optics to allow for the detection of crop type, stage of grown, health, presence of disease, rate of growth and the like. Still further, the system may include ground sensors 333 which may be wired to the control/pivot panel 402 or may wirelessly transmit ground sensor data to the system via a wireless receiver or the like as discussed below.

Still further, the control/pivot panel 402 may further receive data from a connected or remote weather station or the like which is able to measure weather features such as humidity, wind speed, wind direction, pressure, precipitation, temperature and the like. Still further, the system may preferably further include a wired or wireless transceiver/router 324, 325 for receiving and transmitting signals between system elements. Further, the preferred system of the present invention may alternatively further include additional elements mounted to the span 310 such as additional sensors and the like.

Figure 4A:
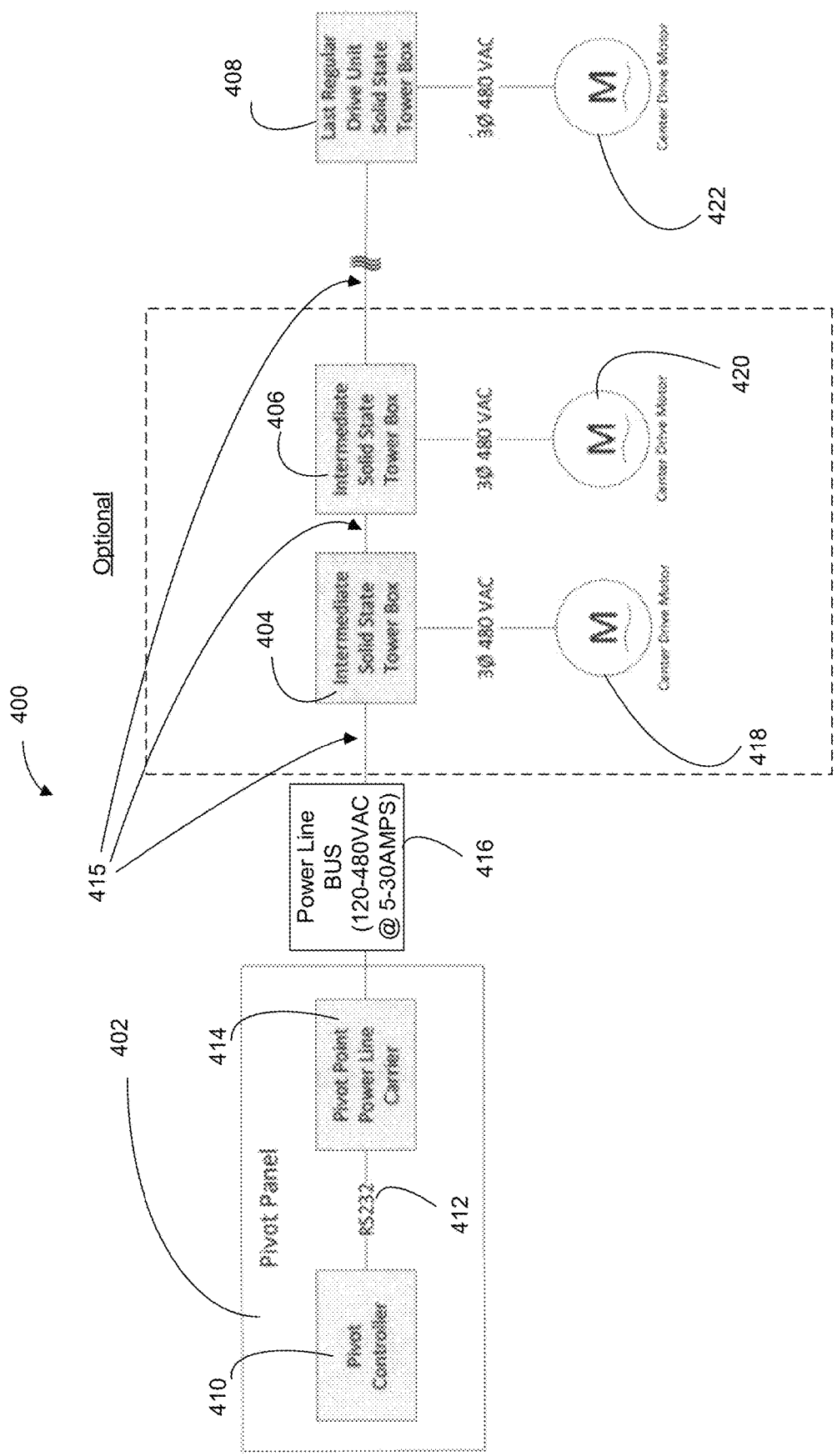
FIG. 4A shows a block diagram in accordance with further preferred embodiment of the present invention.

With reference now to FIG. 4A, further aspects of the present invention shall now be further discussed. As shown in FIG. 4A, the power/control system of the present invention 400 may preferably include the control/pivot panel 402 which preferably provides control signals and power to a series of intermediate solid-state tower boxes 404, 406 and a last regular drive unit (LRDU) tower box 408. As shown, the control/pivot panel 402 in accordance with a preferred embodiment of the present invention may preferably include a main pivot controller 410 connected to a power-line carrier 414 which controls and directs power to downstream intermediate solid-state tower boxes 404, 406 and a LRDU tower box 408. According to a preferred embodiment, the pivot controller 410 is preferably connected to the power-line carrier 414 via a serial communication connection 412 (i.e. RS-232) or the like. According to a still further preferred embodiment, the pivot panel 402 preferably is connected to and provides power and control signals through the power-line carrier 414 to the downstream solid-state tower boxes 404, 406, 408 via a power-line BUS 416 via lines 415.

According to further preferred embodiments, the control/pivot panel 402 of the present invention may preferably be linked via the power line BUS 416 and lines 415 to additional powered elements including: pump stations; injector pumps, valves, and other powered ancillary products. Further, the control/pivot panel 402 of the present invention may preferably remotely monitor and control automated software programs via the power line BUS 416 to operate (i.e. start, stop or change pressure, flow rate, valve position, etc.) aspects of the irrigation system utilizing a PLC control system from a master PLC in the control/pivot panel 402. This may include controlling pipeline valves (i.e. valves 318, 320 in FIG. 3). Further, this may include controlling pumps (i.e. 335 in FIG. 3) which may include for example: electric engine powered pumps; chemigation injection pumps; biologics injection pumps; and the like.

According to a preferred embodiment, the power-line BUS 416 preferably may provide 480 volts AC at 30 amps. According to alternative embodiments, the power-line BUS 416 may provide power anywhere between 120-480 volts at anywhere between 5-50 amps. For instance, the power-line BUS 416 may provide 120 volts AC at 5 amps. According to further preferred alternative embodiments, the power-line BUS 416 may alternatively provide and direct power having any of a variety of different voltages and amps as desired. According to a further preferred embodiment, the power-line carrier of present invention may preferably operate as a one or two-way system.

As further shown in FIG. 4A, the power and control signals provided by the power-line BUS 416 (sent via lines 415) are preferably first received by intermediate solid-state tower box 404 which preferably receives, processes and thereafter directs the received power to a center drive motor 418. Likewise, the power and control signals provided by the power-line box 416 are received by intermediate solid-state tower box 406 which preferably receives, processes and thereafter directs the received power to center drive motor 420. Although not shown, any number of additional intermediate solid-state our boxes may further be incorporated as needed depending on the size of the irrigation system. Regardless of the number of intermediate solid-state our boxes, the power from the power-line bus 416 is preferably finally received at a LRDU solid-state tower box 408 which preferably likewise receives, processes and thereafter directs the received power to a center drive motor 422.

Figure 4B:
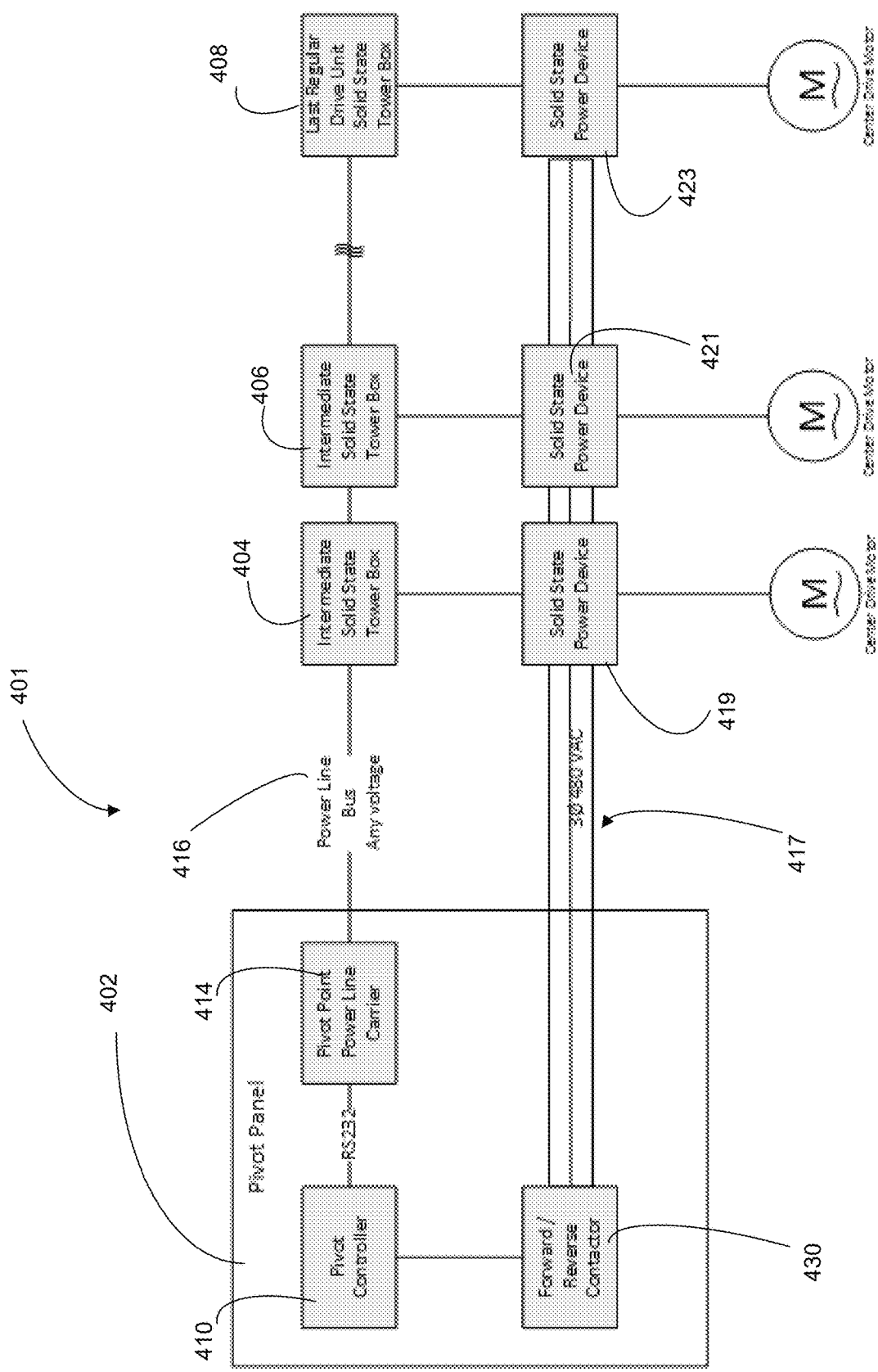
FIG. 4B shows a block diagram in accordance with an alternative preferred embodiment of the present invention.

As further shown in FIG. 4B, according to an alternative preferred embodiment 401, the system of the present may alternatively utilize a separate power circuit 417 (independent from the power-line BUS 416) for providing power from the main pivot controller 410. As shown in FIG. 4B, the separate power circuit 417 may preferably provide power via a forward/reverse contactor 430 or from the irrigation machine's power source, directly to solid state devices 419, 421, 423 within each of the respective tower boxes 404, 406, 408. According to alternative preferred embodiments, the power circuit 417 may be an alternative power supply to the power line BUS 416 or an additional/supplementary power supply.

Figure 5:
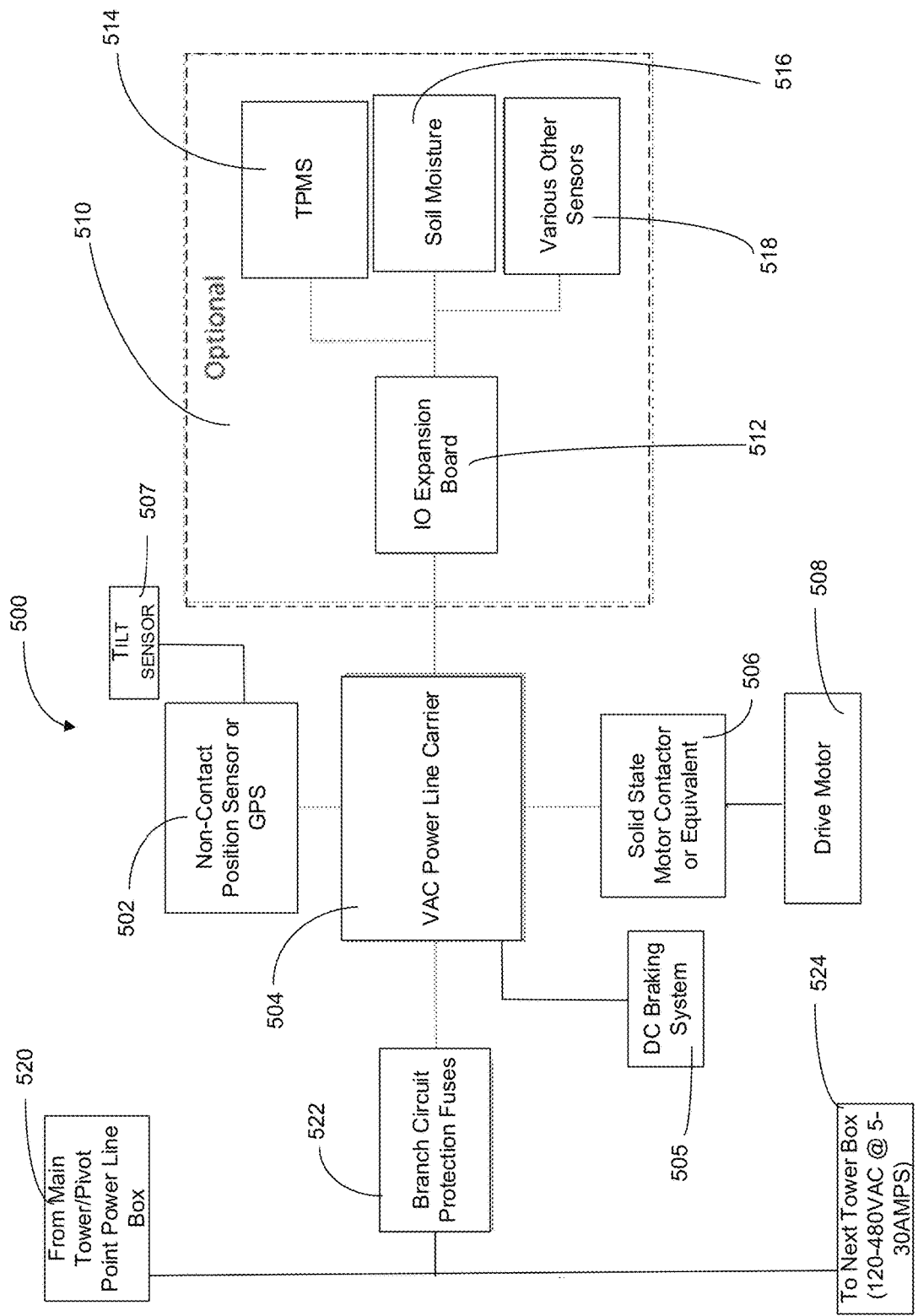
FIG. 5 shows a block diagram in accordance with further preferred embodiment of the present invention.

With reference now to FIG. 5, further detailed aspects of preferred embodiments of the present invention shall now be further discussed. As shown in FIG. 5, an exemplary solid-state tower box 500 may preferably include sensors 502 which may include non-contact position sensors or GPS sensors. Alternatively, the sensors 502 may include proportional or non-proportional (e.g. micro switch) sensors of any type. Still further, these sensors may include contact sensors of any kind. As further shown, other sensors such as tilt sensors 507 may also provide sensor data through the internal power-line carrier 504. Further, data and control signals may be directed through the power-line carrier 504 to and from a braking system such as a DC braking system 505 or the like. Additionally, data and control signals may further be directed through the power-line carrier 504 to and from drive systems and sensors such as solid-state motor contactor(s) 506 and the like.

As further shown, the exemplary solid-state tower box 500 may preferably further include optional connected elements 510 which may be provided via an IO expansion board 512 connected to a variety of sensor elements. As shown for example, the IO expansion board 512 may be interconnected with a Tire Pressure Monitoring System (TPMS) 514, a soil monitoring sensor 516 and/or other sensor elements 518 including those discussed herein. As discussed above with respect to FIGS. 4A-B, the exemplary solid-state tower box 500 preferably receives power and control signals provided by the main tower/pivot point power-line box 520 and preferably receives, processes and thereafter directs the received power to center drive motor 508. As shown, the power/control signals are preferably received through one or more branch circuit protection fuses 522. As further shown, the power from the main tower power-line 520 is preferably further additionally provided downstream to the next tower box 524.

According to further preferred embodiments, data/signals received through the IO expansion board 512 (or from any other sensor input) may preferably be transmitted to the control/pivot panel 402 (as discussed above with regards to FIGS. 2 and 3). Thereafter, the data/signals may be processed by algorithms in the control/pivot panel 402 to modify or create commands transmitted to the tower boxes via the power line carrier 504. Alternatively, the sensor data may be transmitted to a remote server via a cellular, radio or hard-wired data link for additional uses such as analytics, alerting remote operators and the like. In addition, GPS position data from each tower box may preferably be sent or made accessible to other tower boxes and/or the pivot controller 402. This data may then be used for variety of purposes such as calculating alignment between spans.

Figure 6:
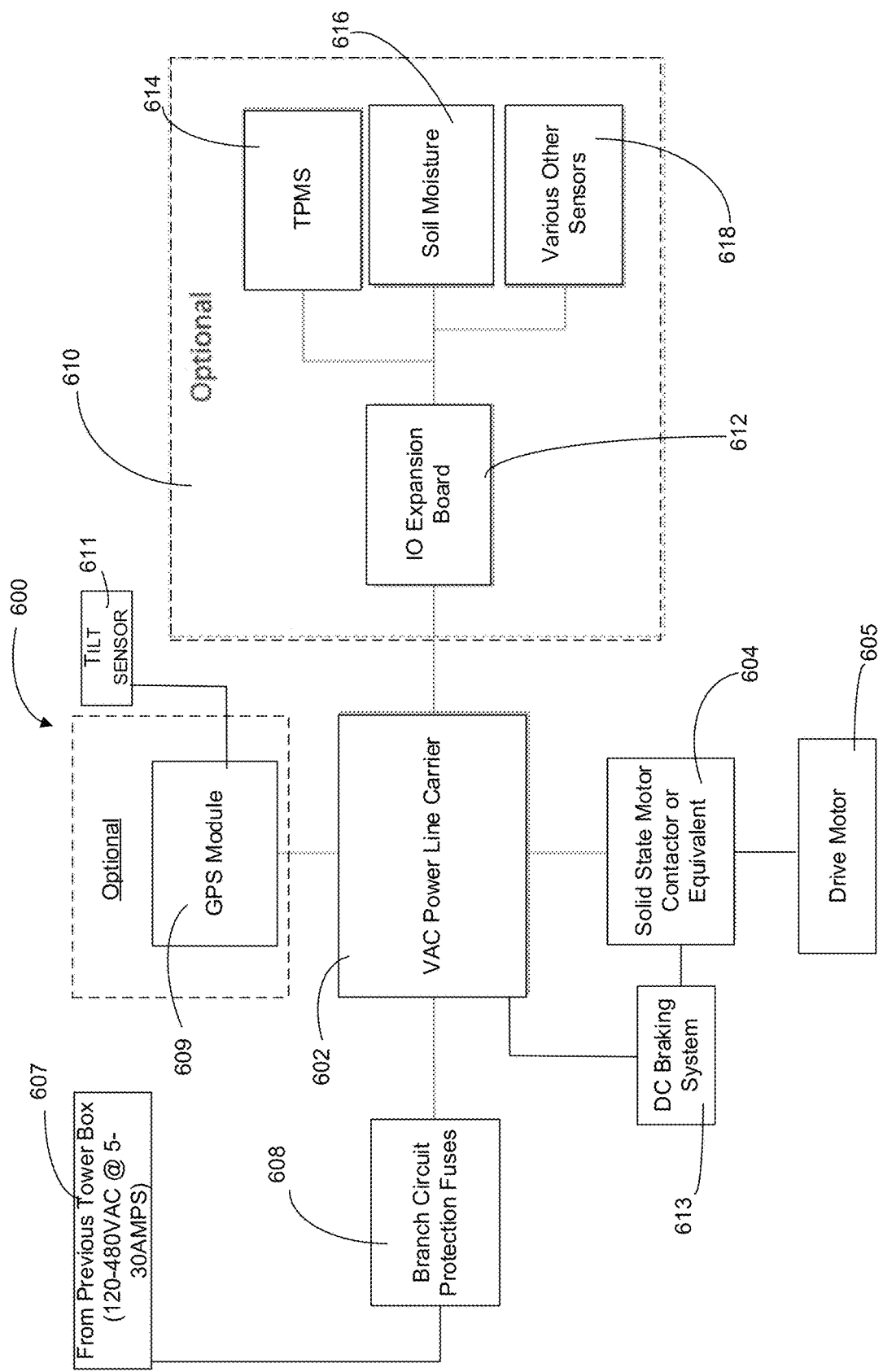
FIG. 6 shows a block diagram in accordance with further preferred embodiment of the present invention.

With further reference now to FIG. 6, additional aspects of the present invention shall now be further discussed. As shown in FIG. 6, an exemplary LRDU solid-state tower box 600 may preferably include a GPS module 609, a tilt sensor 611, an internal power-line carrier 602, and a solid-state motor contactor 604 (or the like). Additional alternative sensors may be included as well, as discussed above. Further, data and control signals may be directed through the power-line carrier 602 to and from a braking system such as a DC braking system 613 or the like, as well as to other motor controllers or sensors. Data from the LRDU solid-state tower box 600 may be processed similar to the data from the intermediate drive towers as discussed above.

As further shown, the exemplary LRDU solid-state tower box 600 may preferably further include optional connected elements 610 which may be provided via an IO expansion board 612 connected to a variety of sensor elements. As shown, for example, the IO expansion board 612 may be interconnected with a Tire Pressure Monitoring System (TPMS) 614, a soil monitoring sensor 616 and/or other sensor elements 618 including those discussed herein. As discussed above with respect to FIGS. 4A-B, the exemplary solid-state tower box 600 preferably receives power and control signals provided by the main tower/pivot point power-line box via the previous tower box 607 in the chain and preferably receives, processes and thereafter directs the received power to center drive motor 605. As shown, the power/control signals are preferably received through one or more branch circuit protection fuses 608.

While the above descriptions regarding the present invention contain much specificity, these should not be construed as limitations on the scope, but rather as examples. Many other variations are possible. For example, the processing elements of the present invention by the present invention may operate on a number of different frequencies, voltages, amps and BUS configurations. Further, the communications provided with the present invention may be designed to be duplex or simplex in nature. Further, as needs require, the processes for transmitting data to and from the present invention may be designed to be push or pull in nature. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for providing power, control and communication within an irrigation system having a plurality of spans and a drive system for moving the span, wherein the system comprises:

a plurality of sprinkler heads, wherein the plurality of sprinkler heads are configured to receive water under pressure and spray water onto a field to be irrigated;

a position sensing system;

a pivot panel, wherein the pivot panel is comprised of a pivot panel processor, wherein the processor is comprised of a power line control module for receiving and initiating the transmission of power and control signals to a plurality of solid state tower boxes;

a power-line BUS; wherein the power-line BUS is electrically connected to the pivot panel processor;

a power-line carrier, wherein the power-line carrier is comprised of a plurality of electrically conductive elements which are configured to connect and deliver signals to and from the power-line BUS to the plurality of solid state tower boxes;

a first drive tower, wherein the first drive tower is comprised of a first tower box, a first tower drive unit, and a plurality of first tower drive wheels; wherein the first tower box is electrically connected to the motor of the first tower drive unit; wherein the first tower box is configured to receive control signals and power directed from the power control module; wherein the first tower drive unit is configured to provide power to produce torque and braking on the first drive wheels;

a second drive tower, wherein the second drive tower is comprised of a second tower box, a second tower drive unit, and a plurality of second tower drive wheels; wherein the second tower box is electrically connected to the motor of the second tower drive unit; wherein the second tower box is configured to receive control signals and power directed from the power control module via the first drive tower; wherein the second tower drive unit is configured to provide power to produce torque and braking on the second drive wheels; and a third drive tower, wherein the third drive tower is comprised of a third tower box, a third tower drive unit, and a plurality of third tower drive wheels; wherein the third tower box is electrically connected to the motor of the third tower drive unit; wherein the third tower box is configured to receive control signals and power directed from the power control module via the second drive tower; wherein the third tower drive unit is configured to provide power to produce torque and braking on the third drive wheels.

2. The system of claim 1, wherein the pivot panel is connected to the power-line carrier via a serial communication connection.

3. The system of claim 2, wherein the pivot controller is connected to the power-line carrier via a communication connection.

4. The system of claim 3, wherein the system further comprises a second power circuit.

5. The system of claim 4, wherein the second power circuit is independent from the power-line BUS.

6. The system of claim 5, wherein the second power circuit is configured to transmit power from the main pivot controller to at least one tower box.

7. The system of claim 4, wherein the second power circuit transmits power via a forward/reverse contactor directly to solid state devices within at least one tower box.

8. The system of claim 4, wherein the solid-state tower box is further comprised of an JO expansion board; wherein the JO expansion board is connected to a plurality of sensor elements.

9. The system of claim 8, wherein the solid-state tower box is further comprised of a non-contact position sensor.

10. The system of claim 8, wherein the solid-state tower box is further comprised of a proportional sensor.

11. The system of claim 8, wherein the solid-state tower box is further comprised of a Tire Pressure Monitoring System (TPMS).

12. The system of claim 8, wherein the power/control signals are preferably received through one or more branch circuit protection fuses.

13. The system of claim 2, wherein the power-line BUS is configured to provide 120-480 volts AC to the plurality of solid state tower boxes.

14. The system of claim 13, wherein the power-line BUS transmits 480 volts AC at 30 amps.

15. The system of claim 13, wherein the power-line BUS transmits 120 volts AC at 5 amps.

16. The system of claim 13, wherein the system further comprises: a plurality of transducers; wherein the transducers are configured to control and regulate water pressure.

* * * * *